(12) United States Patent
DiLeo et al.

(10) Patent No.: US 8,007,568 B2
(45) Date of Patent: Aug. 30, 2011

(54) FILTER WITH MEMORY, COMMUNICATION AND PRESSURE SENSOR

(75) Inventors: Anthony DiLeo, Westford, MA (US); John Dana Hubbard, Billerica, MA (US)

(73) Assignee: Millipore Corporation, Billerica, MA (US)

( * ) Notice: Subject to any disclaimer, the term of this patent is extended or adjusted under 35 U.S.C. 154(b) by 941 days.

(21) Appl. No.: 11/402,438

(22) Filed: Apr. 12, 2006

(65) Prior Publication Data

US 2007/0240492 A1  Oct. 18, 2007

(51) Int. Cl.
*B01D 46/46* (2006.01)
(52) U.S. Cl. ............... 95/19; 96/113; 96/421; 73/37; 73/38
(58) Field of Classification Search ........ 95/19; 96/113, 96/421; 73/37, 38
See application file for complete search history.

(56) References Cited

U.S. PATENT DOCUMENTS

| | | |
|---|---|---|
| 2,131,509 A | 9/1938 | Goepel et al. |
| 3,698,556 A | 10/1972 | Emmett et al. |
| 3,877,893 A | 4/1975 | Sweny et al. |
| 4,052,176 A | 10/1977 | Child et al. |
| 4,211,075 A | 7/1980 | Ludecke et al. |
| 4,272,109 A | 6/1981 | Ahlstone |
| 4,552,572 A | 11/1985 | Galstaun |
| 4,568,364 A | 2/1986 | Galstaun |
| 4,840,648 A | 6/1989 | Grunewald et al. |
| 4,957,515 A | 9/1990 | Hegarty |
| 5,040,805 A | 8/1991 | Ozora |
| 5,121,929 A | 6/1992 | Cobb ........................ 277/317 |
| 5,240,476 A | 8/1993 | Hegarty |
| 5,240,612 A | 8/1993 | Grangeon et al. |
| 5,246,235 A | 9/1993 | Heinzen ..................... 277/321 |
| 5,256,294 A | 10/1993 | Van Reis |
| 5,367,910 A | 11/1994 | Woodward et al. |
| 5,476,592 A | 12/1995 | Simard |
| 5,540,448 A | 7/1996 | Heinzen ..................... 277/321 |
| 5,560,278 A | 10/1996 | Lark ............................ 92/5 R |
| 5,581,017 A | 12/1996 | Bejtlich, III ................... 73/38 |
| 5,581,019 A | 12/1996 | Minor et al. |

(Continued)

FOREIGN PATENT DOCUMENTS

CN  1619277  5/2005

(Continued)

OTHER PUBLICATIONS

The European communication dated Oct. 30, 2007.

(Continued)

*Primary Examiner* — Robert J Hill, Jr.
*Assistant Examiner* — Christopher P Jones
(74) *Attorney, Agent, or Firm* — Nields, Lemack & Frame, LLC (57) ABSTRACT

The present invention describes a system and method for accurately measuring the pressure within a filter housing. A pressure sensor and a communications device are coupled so as to be able to measure and transmit the pressure within the filter housing while in use. This system can comprise a single component, integrating both the communication device and the pressure sensor. Alternatively, the system can comprise separate sensor and transmitter components, in communication with one another. In yet another embodiment, a storage element can be added to the system, thereby allowing the device to store a set of pressure values. The use of this device is beneficial to many applications. For example, the ability to read pressure values in situ allows integrity tests to be performed without additional equipment. In addition, integrity testing for individual filters within multi-filter configurations is possible.

12 Claims, 5 Drawing Sheets

U.S. PATENT DOCUMENTS

| | | | | |
|---|---|---|---|---|
| 5,624,537 | A | 4/1997 | Turner et al. | 422/82.01 |
| 5,674,381 | A | 10/1997 | Den Dekker | 210/85 |
| 5,683,119 | A | 11/1997 | Emmons et al. | |
| 5,786,528 | A | 7/1998 | DiLeo et al. | |
| 5,947,689 | A | 9/1999 | Schick | |
| 6,003,872 | A | 12/1999 | Nord | 277/317 |
| 6,077,435 | A | 6/2000 | Beck et al. | 210/636 |
| 6,090,187 | A * | 7/2000 | Kumagai | 95/278 |
| 6,090,356 | A | 7/2000 | Jahnke et al. | |
| 6,265,973 | B1 | 7/2001 | Brammall et al. | 340/568.1 |
| 6,296,770 | B1 | 10/2001 | Wilcox et al. | |
| 6,333,699 | B1 | 12/2001 | Zierolf | 340/854.8 |
| 6,350,382 | B1 | 2/2002 | Schick | |
| 6,365,395 | B1 | 4/2002 | Antoniou | |
| 6,471,853 | B1 | 10/2002 | Moscaritolo | 210/85 |
| 6,485,703 | B1 | 11/2002 | Cote et al. | 424/9.1 |
| 6,595,523 | B1 | 7/2003 | Heinzen | 277/321 |
| 6,615,639 | B1 | 9/2003 | Heinzen | |
| 6,649,829 | B2 | 11/2003 | Garber et al. | 174/47 |
| 6,652,740 | B2 | 11/2003 | Schoess | 210/90 |
| 6,694,727 | B1 | 2/2004 | Crawley et al. | |
| 6,853,203 | B2 | 2/2005 | Beylich et al. | |
| 6,897,374 | B2 | 5/2005 | Garber et al. | 174/47 |
| 6,936,160 | B2 | 8/2005 | Moscaritolo et al. | 210/85 |
| 6,983,504 | B2 | 1/2006 | Grummert et al. | |
| 7,009,409 | B2 | 3/2006 | Davie et al. | 324/658 |
| 7,048,775 | B2 | 5/2006 | Jornitz et al. | |
| 7,198,303 | B2 | 4/2007 | Brophy, III et al. | |
| 7,264,649 | B1 | 9/2007 | Johnson et al. | |
| 7,398,692 | B2 | 7/2008 | Hiroki et al. | |
| 7,594,425 | B2 | 9/2009 | Lewnard et al. | |
| 2001/0006485 | A1 | 7/2001 | Kubiak et al. | |
| 2001/0042684 | A1 | 11/2001 | Essalik et al. | 204/426 |
| 2001/0042707 | A1 | 11/2001 | Niers et al. | 210/85 |
| 2002/0093431 | A1 | 7/2002 | Zierolf | 340/854.1 |
| 2002/0096467 | A1 | 7/2002 | Cappia et al. | |
| 2002/0144938 | A1 | 10/2002 | Hawkins et al. | |
| 2003/0042688 | A1 | 3/2003 | Davie et al. | 277/590 |
| 2003/0047517 | A1 | 3/2003 | Schoess | 210/741 |
| 2003/0090390 | A1 | 5/2003 | Snider et al. | 340/853.3 |
| 2003/0116487 | A1 | 6/2003 | Petersen | 210/85 |
| 2003/0168408 | A1 | 9/2003 | Rajagopalan et al. | 210/650 |
| 2003/0179002 | A1 | 9/2003 | Beylich et al. | 324/663 |
| 2004/0079686 | A1 | 4/2004 | Moscaritolo et al. | |
| 2004/0112529 | A1 | 6/2004 | Karlsson et al. | 156/306.6 |
| 2004/0130438 | A1 | 7/2004 | Garber | 340/10.2 |
| 2004/0135684 | A1 | 7/2004 | Steinthal et al. | |
| 2004/0172210 | A1* | 9/2004 | Rothfuss et al. | 702/100 |
| 2004/0188331 | A1 | 9/2004 | Moscaritolo | |
| 2004/0239521 | A1 | 12/2004 | Zierolf | 340/854.1 |
| 2004/0256328 | A1* | 12/2004 | Jornitz et al. | 210/739 |
| 2005/0039749 | A1 | 2/2005 | Emerson | |
| 2005/0156487 | A1 | 7/2005 | Tseng et al. | |
| 2005/0211934 | A1 | 9/2005 | Garber et al. | 251/129.01 |
| 2005/0224577 | A1 | 10/2005 | Rozenblat et al. | 235/385 |
| 2005/0247114 | A1 | 11/2005 | Kahn et al. | |
| 2006/0060512 | A1 | 3/2006 | Astle et al. | |
| 2007/0193361 | A1 | 8/2007 | Coffey et al. | 73/780 |
| 2007/0241510 | A1 | 10/2007 | DiLeo | 277/321 |
| 2008/0041165 | A1 | 2/2008 | Coffey et al. | 73/761 |
| 2008/0258401 | A1 | 10/2008 | Cotton | 277/321 |

FOREIGN PATENT DOCUMENTS

| | | |
|---|---|---|
| DE | 641 246 | 1/1937 |
| DE | 41 06 080 | 6/1991 |
| DE | 101 51 270 | 10/2001 |
| DE | 202 15 056 | 3/2003 |
| EP | 0 518 250 | 12/1992 |
| EP | 0 638 798 | 8/1994 |
| EP | 0 640 822 | 11/1996 |
| EP | 0 700 313 | 11/1996 |
| EP | 1 106 962 | 6/2001 |
| EP | 1 340 976 | 9/2003 |
| EP | 1 473 069 | 11/2004 |
| GB | 2 303 082 | 2/1997 |
| JP | 6-67458 | 3/1994 |
| JP | 6-79147 | 3/1994 |
| JP | 2002-519880 | 7/2002 |
| JP | 2002-538519 | 11/2002 |
| JP | 2002-539441 | 11/2002 |
| JP | 9-24209 A | 10/2010 |
| NO | 20020499 | 3/2002 |
| RU | 1 259 869 | 6/1993 |
| WO | 85/02783 | 7/1985 |
| WO | 94/11721 | 5/1994 |
| WO | 99/67851 | 12/1999 |
| WO | 00/40322 | 7/2000 |
| WO | 00/50849 | 8/2000 |
| WO | 00/54841 | 9/2000 |
| WO | 01/16030 | 3/2001 |
| WO | 02/078823 | 10/2002 |
| WO | 02/088618 | 11/2002 |
| WO | 03/037483 | 5/2003 |
| WO | 2004/016334 | 2/2004 |
| WO | 2004/082743 | 9/2004 |
| WO | 2004/085027 | 10/2004 |
| WO | 2005/031195 | 4/2005 |
| WO | 2005/091959 A2 | 10/2005 |
| WO | 2005/102401 A2 | 11/2005 |
| WO | 2006/026253 | 3/2006 |
| WO | 2008/008426 | 1/2008 |

OTHER PUBLICATIONS

The European communication dated Nov. 12, 2007.
European communication dated Jan. 16, 2009.
Japanese communication dated Jan. 13, 2009.
Chinese communication dated Feb. 6, 2009.
Office Action in U.S. Appl. No. 11/402,437 dated Feb. 25, 2009.
The European communication dated Mar. 28, 2008.
Chinese communication dated Apr. 17, 2009 (for 200710096551.2).
Chinese communication dated Apr. 17, 2009 (for 200710096800.8).
Millipore publication "Steam-in-Place Method for Millipore Express SHF Filters" 4-Pages.
Pharmaceutical Technology, Oct. 2004—Filtration for Aseptec Processing; Supplement to Pharmaceutical Technology; Princiles of Steam-in-Place; Jean-Marc Cappia (4-Pages).
European communication dated May 26, 2008 (EP08153280).
European communication dated May 26, 2008 (EP08153281).
European communication dated Jul. 23, 2007.
European communication dated Jul. 24, 2007.
Office Action dated Sep. 23, 2009 in co-pending U.S. Appl. No. 11/402,737.
Office Action dated Jul. 23, 2009 in co-pending U.S. Appl. No. 12/315,683.
Office Action dated Sep. 1, 2009 in co-pending U.S. Appl. No. 11/402,530.
Office Action dated Sep. 29, 2009 in co-pending U.S. Appl. No. 11/402,437.
Office Action dated Nov. 9, 2009 in co-pending U.S. Appl. No. 12/455,000.
European communication dated Nov. 27, 2009.
OA dated Mar. 4, 2010 in co-pending U.S. Appl. No. 12/315,683.
OA dated Mar. 16, 2010 in co-pending U.S. Appl. No. 11/402,530.
Japanese communication dated Mar. 16, 2010 in co-pending foreign application JP2007-101613.
OA dated Mar. 12, 2010 in co-pending U.S. Appl. No. 11/402,737.
OA dated Jan. 20, 2010 in co-pending U.S. Appl. No. 12/454,092.
OA dated Feb. 19, 2010 in co-pending U.S. Appl. No. 11/402,437.
European communication dated Feb. 3, 2010 in co-pending foreign application 07251310.4.
European communication dated Feb. 2, 2010 in co-pending foreign application 07251311.2.
OA dated May 6, 2010 in co-pending U.S. Appl. No. 12/454,092.
European communication dated Mar. 25, 2010 in co-pending foreign application EP08153281.4.
Japanese communication dated May 11, 2010 in co-pending foreign application JP2007-102696.
OA dated Jun. 29, 2010 in co-pending U.S. Appl. No. 12/455,000.
Final Rejection dated Nov. 22, 2010 in a related US application, U.S. Appl. No. 12/454,092.

Office Action dated Nov. 10, 2010 in a related US application, U.S. Appl. No. 12/315,683.
Notice of Allowance dated Dec. 3, 2010 in a related US application, U.S. Appl. No. 12/455,000.
Office Action dated Dec. 27, 2010 in a related US application, U.S. Appl. No. 12/901,547.
Office Action dated Dec. 10, 2010 in a related US application, U.S. Appl. No. 12/703,246.
Final Rejection dated Jan. 27, 2011 in co-pending U.S. Appl. No. 12/703,246, filed Feb. 10, 2010.
Office Action dated Jan. 18, 2011 in corresponding U.S. Appl. No. 12/894,652, filed Sep. 30, 2010.
Office Action dated Jan. 18, 2011 in corresponding U.S. Appl. No. 12/894,685, filed Sep. 30, 2010.
Office Action dated Feb. 14, 2011 in corresponding U.S. Appl. No. 12/969,153, filed Dec. 15, 2010.
Journal of Membrane Science 130 (1997) 123-140; R. van Reis et al.; "Constant Cwall Ultrafiltation Process Control".
European Search Report dated Aug. 27, 2010 in co-pending foreing application (EP10168357).
European Search Report dated Jul. 30, 2010 in corresponding foreign application (EP10168595).
European communication dated Sep. 10, 2010 in corresponding foreign application (EP08171668.0).
Japanese communication dated Jun. 15, 2010 in co-pending foreign application (JP2007-100632).
Office Action dated May 20, 2009 and Aug. 20, 2010 in co-pending foreign application 11/402,748.
Millipore Publication, "Filter Integrity Test Methods", (1999), pp. 1-12.
Final Rejection dated Mar. 9, 2011 in co-pending U.S. Appl. No. 11/402,737.
Final Rejection dated Mar. 1, 2011 in co-pending U.S. Appl. No. 12/315,683.
Office Action dated Mar. 23, 2011 in corresponding U.S. Appl. No. 12/984,341.
Office Action dated Feb. 28, 2011 in corresponding U.S. Appl. No. 12/984,145.
Office Action dated Mar. 9, 2011 in corresponding U.S. Appl. No. 12/984,155.
Sunshine, "Passive Chemical Sensor", U.S. Appl. No. 60/477,624, Jun. 10, 2003, pp. 1-13.
Final Rejection dated Apr. 21, 2011 in co-pending U.S. Appl. No. 12/901,547.
Office Action dated Apr. 19, 2011 in co-pending U.S. Appl. No. 12/898,134.
Final Rejection dated May 2, 2011 in corresponding U.S. Appl. No. 12/894,684.
Final Rejection dated Jun. 3, 2011 in corresponding U.S. Appl. No. 12/894,652.
Final Rejection dated Jun. 2, 2011 in corresponding U.S. Appl. No. 12/969,153.
Final Rejection dated Jul. 14, 2011 in corresponding U.S. Appl. No. 12/984,155.

* cited by examiner

Figure 1: Transmembrane Pressure Probe / RFID Communication Device within Filter Endcap

Figure 2: Transmembrane Pressure Probe / RFID Communication Device within Multi-Element Filter Configuration

Figure 3: In-Situ Integrity Test Configuration Transmembrane Pressure Probe / RFID Communication Device within Multi-Element Filter Configuration

Figure 4: In-Situ Integrity Test Configuration Flow Sensor / RFID Communication Device within Multi-Element Filter Configuration

Figure 5: In-Situ Integrity Test Configuration Pressure Sensor / RFID Communication Device within Multi-Element Tangential Flow Filter Configuration

FILTER WITH MEMORY, COMMUNICATION AND PRESSURE SENSOR

BACKGROUND OF THE INVENTION

The use of RFID tags has become prevalent, especially in the management of assets, particularly those applications associated with inventory management. For example, the use of RFID tags permits the monitoring of the production line and the movement of assets or components through the supply chain.

To further illustrate this concept, a manufacturing entity may adhere RFID tags to components as they enter the production facility. These components are then inserted into the production flow, forming sub-assemblies in combination with other components, and finally resulting in a finished product. The use of RFID tags allows the personnel within the manufacturing entity to track the movement of the specific component throughout the manufacturing process. It also allows the entity to be able to identify the specific components that comprise any particular assembly or finished product.

In addition, the use of RFID tags has also been advocated within the drug and pharmaceutical industries. In February 2004, the United States Federal and Drug Administration issued a report advocating the use of RFID tags to label and monitor drugs. This is an attempt to provide pedigree and to limit the infiltration of counterfeit prescription drugs into the market and to consumers.

Since their introduction, RFID tags have been used in many applications, such as to identify and provide information for process control in filter products. U.S. Pat. No. 5,674,381, issued to Den Dekker in 1997, discloses the use of "electronic labels" in conjunction with filtering apparatus and replaceable filter assemblies. Specifically, the patent discloses a filter having an electronic label that has a read/write memory and an associated filtering apparatus that has readout means responsive to the label. The electronic label is adapted to count and store the actual operating hours of the replaceable filter. The filtering apparatus is adapted to allow use or refusal of the filter, based on this real-time number. The patent also discloses that the electronic label can be used to store identification information about the replaceable filter.

A patent application by Baker et al, published in 2005 as U.S. Patent Application Publication No. US2005/0205658, discloses a process equipment tracking system. This system includes the use of RFID tags in conjunction with process equipment. The RFID tag is described as capable of storing "at least one trackable event". These trackable events are enumerated as cleaning dates, and batch process dates. The publication also discloses an RFID reader that is connectable to a PC or an internet, where a process equipment database exists. This database contains multiple trackable events and can supply information useful in determining "a service life of the process equipment based on the accumulated data". The application includes the use of this type of system with a variety of process equipment, such as valves, pumps, filters, and ultraviolet lamps.

Another patent application, filed by Jornitz et al and published in 2004 as U.S. Patent Application Publication No. 2004/0256328, discloses a device and method for monitoring the integrity of filtering installations. This publication describes the use of filters containing an onboard memory chip and communications device, in conjunction with a filter housing. The filter housing acts as a monitoring and integrity tester. That application also discloses a set of steps to be used to insure the integrity of the filtering elements used in multi-round housings. These steps include querying the memory element to verify the type of filter that is being used, its limit data, and its production release data.

U.S. Pat. No. 6,936,160, issued to Moscaritolo in 2005, describes a wireless MEMS sensing device, for use with filtering elements. Moscaritolo describes a MEMS device, having at least two different sensors in a single assembly package. The patent discloses use of this MEMS device in the end cap of a filter, preferably for measuring differential pressure of a fluid, thereby allowing it to monitor the operating conditions within the housing. Related patents also describe the use of this MEMS device to estimate and predict a filter's life.

Despite the improvements that have occurred through the use of RFID tags, there are additional areas that have not been satisfactorily addressed. For example, there are a number of applications, such as in-situ filter integrity testing and filter life monitoring via transmembrane pressure changes, in which real time monitoring of the pressure at various points within the filter housing would be extremely beneficial.

SUMMARY OF THE INVENTION

The shortcomings of the prior art are overcome by the present invention, which describes a system and method for accurately measuring the pressure and/or flow at various points within a filter housing. In one embodiment, a sensor, capable of measuring the pressure at a specific point is used. In a second embodiment, a differential pressure sensor, capable of measuring the difference in pressure between two points, is employed. In a third embodiment, a gas flow meter is incorporated into the nose of a filter for directly measuring the flow of gas through that point in the filter. Similarly, a differential pressure sensor or a liquid flow sensor can be incorporated in a TFF module to measure the flow of critical fluids, like cleaning fluids, within a system. These sensors are in communication with a communications device so that the combination is able to measure and transmit the pressure measurement, while the filter is in use. This system can comprise a single component, integrating both the communication device and the pressure sensor. Alternatively, the system can comprise separate sensor and transmitter components, in communication with one another. The transmitter component can utilize either wired or wireless communication. In yet another embodiment, a storage element can be added to the system, thereby allowing the device to store a set of pressure values.

The use of this device is beneficial to many applications. For example, the ability to monitor transmembrane pressure across each filter individually in a multiple filter configuration improves the reliability and validity of an integrity test. This also allows the integrity of each filtering element to be individually determined in situ. The ability to monitor the transmembrane pressure within the filter housing also enables the plugging of multi-layer filters to be monitored, allowing the life of the filter to be estimated.

DETAILED DESCRIPTION OF THE INVENTION

Figure 1:
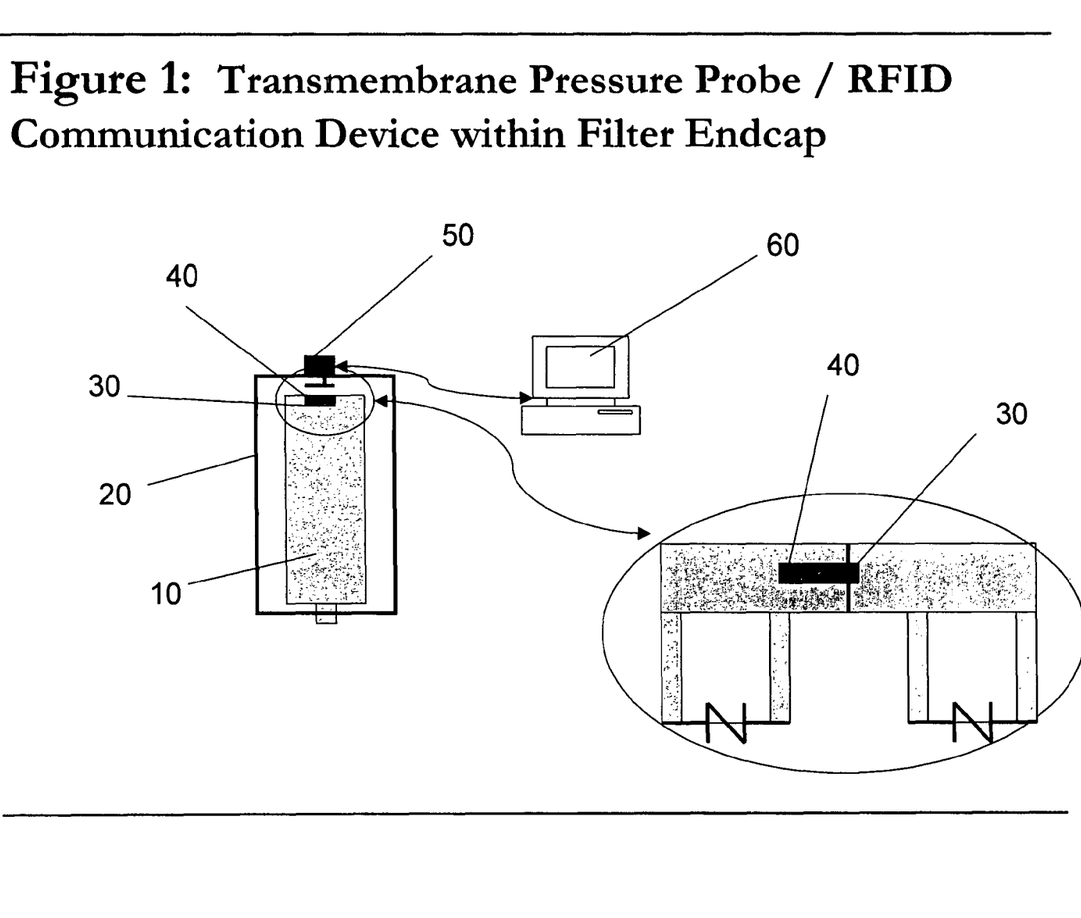
FIG. 1 is a representative embodiment of the present invention.
Figure 2:
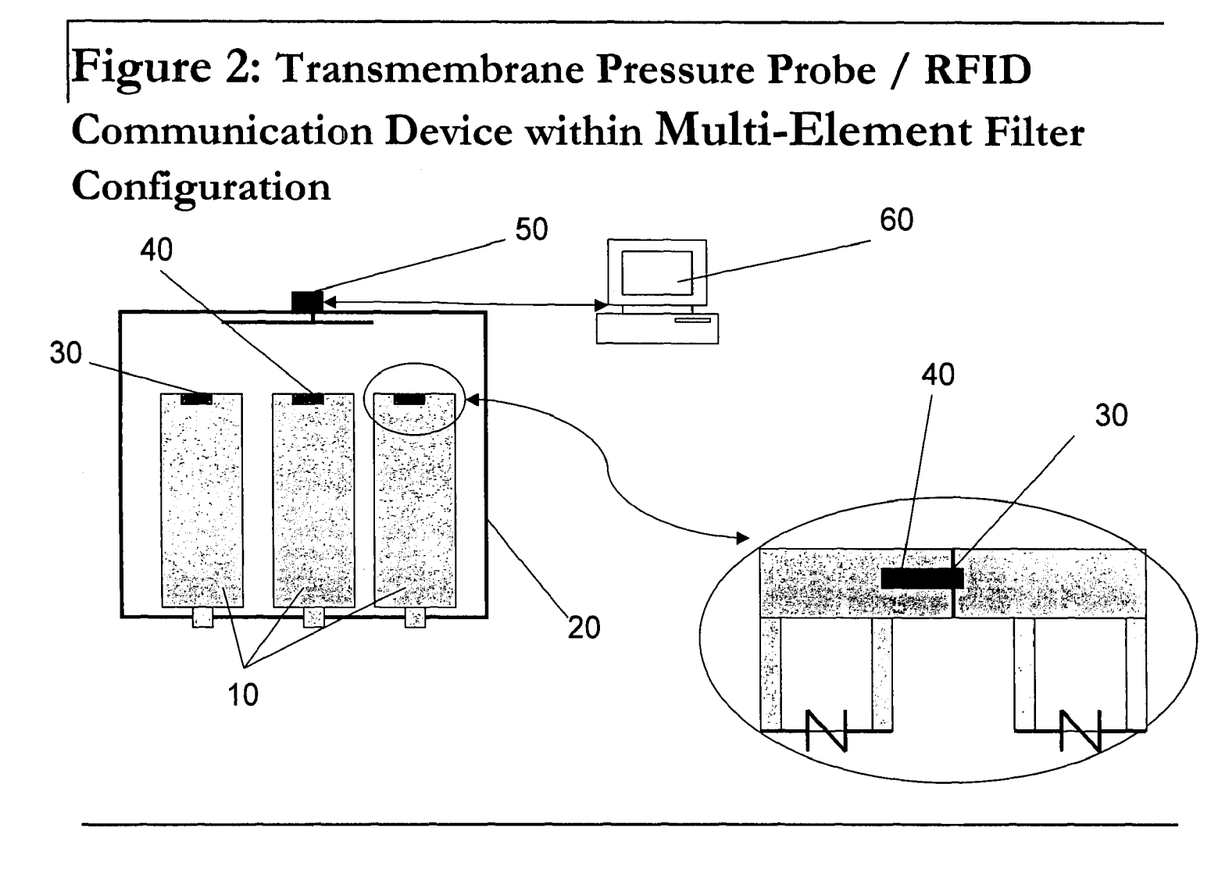
FIG. 2 is a representative embodiment of the present invention as used in a multi-element filter configuration.

FIG. 1 illustrates a representative filtering system in accordance with the present invention. The filter element 10 is enclosed with a housing 20. The filter element can be simply a porous material, such as pleated paper or PVDF (Polyvinylidene fluoride) membrane. In an alternative embodiment, shown in FIG. 2, multiple filter elements 10 are enclosed within one housing 20. Alternatively, the filter element may comprise a frame, such as of plastic, and a porous material. Located in close proximity of, preferably affixed to, and most preferably embedded in, the end cap of filter element 10 is a pressure sensor 30. This sensor 30 is capable of generating an output, which varies as a function of the pressure of the surrounding environment. In another embodiment, the sensor is a differential sensor, whereby its output is a function of the difference is pressure between two areas. This output can be in the form of an analog voltage or current, or can be a digital value or pulse. In the preferred embodiment, the output varies linearly with the pressure, however this is not a requirement. Any output having a known relationship, such as logarithmic or exponential, to the surrounding pressure, can be employed. In such a situation, a transformation of the output can be performed to determine the actual measured pressure.

The pressure sensor 30 is preferably a differential sensor, and is mounted on, or preferably embedded in, the end cap of the filter element 10. The sensor is positioned such that it is capable of measuring both the upstream and downstream pressure. In some applications, the temperature of the filter element may exceed 145° C., therefore a sensor that is stable at these temperatures should be employed. Similarly, a transmitter capable of withstanding this temperature should be employed. Finally, the temperature with the housing 20 may cycle from lower temperatures to higher temperatures and back, therefore the pressure sensor should be able to withstand temperature cycling.

There are multiple embodiments of this pressure sensor. For example, this sensor can be constructed using micro-electro-mechanical system (MEMS) technology, a piezoelectric element, a conductive or resistive polymer, including elastomers and inks, or a transducer. While a differential pressure sensor is preferred, since it is the difference between the upstream pressure and the downstream pressure that is of interest, separate pressure sensors, one on either side of the filter, may also be employed. These examples are intended to be illustrative of some of the types of sensors that can be used; this is not intended to be an exhaustive list of all such suitable pressure sensors.

The pressure sensor 30 is in communication with a transmitter 40, which can be either wired or wireless. Mechanisms for transmitting wireless signals outside the housing have been disclosed and are known in the art. United States Patent Application Publication 2004/0256328 describes the use of an antenna to relay information between transponders located on the filter housing to a monitoring and test unit external to the housing.

Figure 3:
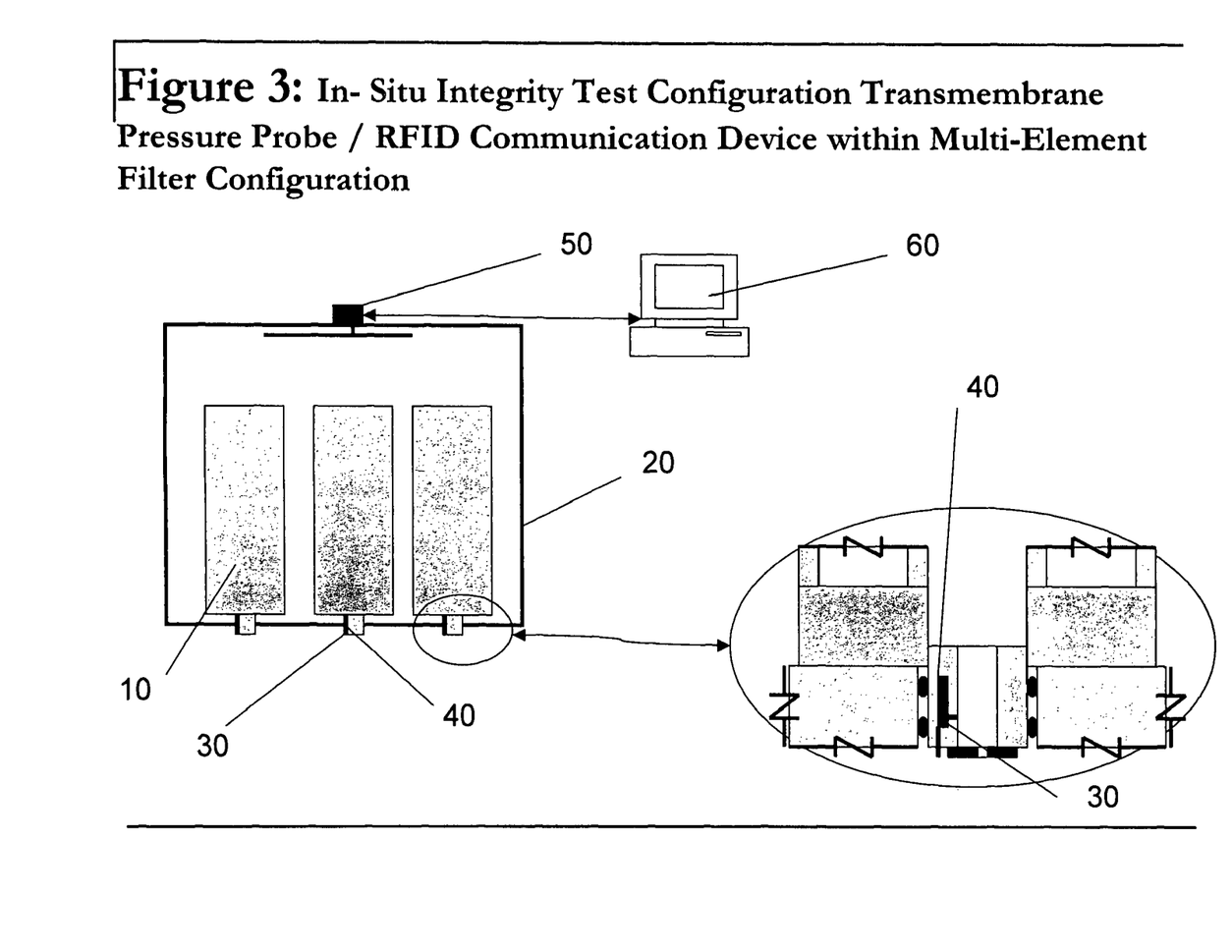
FIG. 3 is a first representative embodiment of the present invention as used to perform in situ integrity testing within multi-element filter configurations.

For flow measuring applications, such as those shown in FIG. 3, the pressure sensor 30 may optionally be combined with a restriction orifice to achieve the sensitivity needed for the application. This orifice or venturi restriction device is typically used to measure liquid flow, but it may also be used to measure gas flow when higher sensitivity than can be achieved by measurement within the dimensions of the main flow path, like the core of a filter, is required. For example, the flow rate typically experienced during diffusion is 10 cc/min. In contrast, the flow rate during convection is 500 cc/min to 1000 cc/min.

Figure 4:
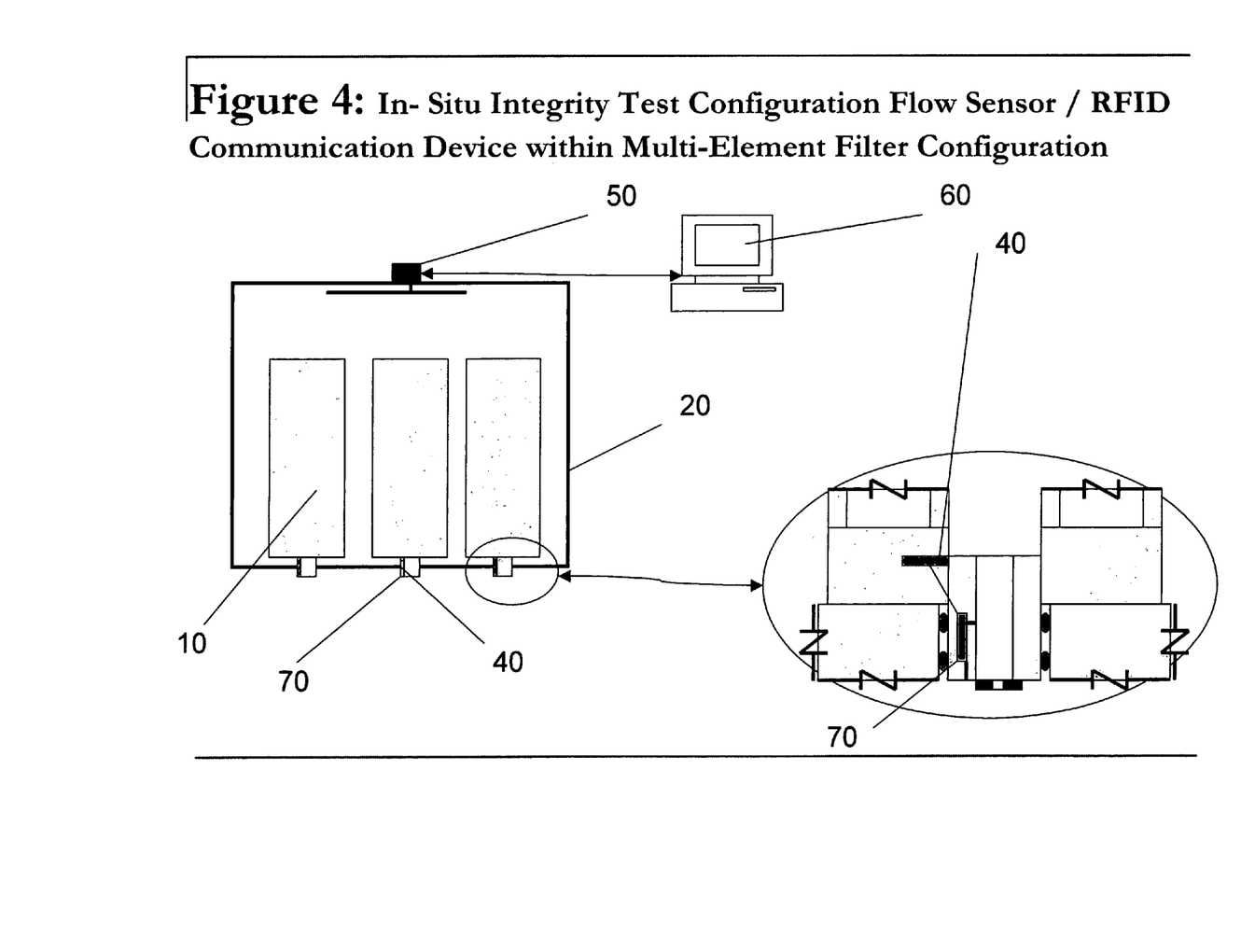
FIG. 4 is a second representative embodiment of the present invention as used to perform in situ integrity testing within multi-element filter configurations.

FIG. 4 shows the use of flow rate sensors 70, instead of pressure sensors. There are multiple embodiments of direct flow rate measuring sensors. In gas flow measuring applications, flow measurement is typically determined by monitoring changes in temperature. These devices can be based upon an anemometer within which a current is passed and the anemometer wire heated. The anemometer is cooled due to the gas flow and this is measured as a current change in the sensor. Alternately, a slip stream of gas is passed through a narrow capillary within which are two thermal coils, one pulses heat into the flowing gas the other detects the time for the temperature pulse to reach it. This is correlated to total gas flow by properly designing the capillary to mail gas flow tube diameters. Other methods of measuring flow rate are known in the art, and are within the scope of the invention, as this list is not meant to be exhaustive. The location of the flow rate sensor is important, as certain locations within the filter housing are not subjected to the full flow. For example, a flow rate sensor near the end cap of the filter element would experience very little flow, especially as compared to one near the open end of the filter element.

A transmitter 40 is also located near, or integrated with, the sensor 30. In one embodiment, the transmitter 40 and the pressure sensor 30 are encapsulated in a single integrated component. Alternatively, the transmitter 40 and the sensor 30 can be separated, and in communication with each other, such as via electrical signals. Various types of communication are possible, such as wired and wireless. Various wireless communication devices are possible, although the use of an RFID tag is preferred. An active RFID tag allows regular communication with the reader. Alternatively, a passive RFID tag can be used, whereby the energy to transmit and sense the temperature is obtained from the electromagnetic field transmitted by the RFID reader.

Optionally, a storage element 50 can be used in conjunction with the transmitter 40 and the pressure sensor 30. This storage element 50, which is preferably a random access memory (RAM) or FLASH EPROM device, can be used to store a set of pressure readings, such as may be generated by regular sampling of the sensor.

This allows the rate at which the transmitter 40 sends data to be different from the rate at which the pressure is sampled. For example, the pressure may be sampled 10 times per second, while the data is transmitted only once per second.

A wireless receiver, 60, optionally located outside the filter housing 20, is used to communicate with the wireless transmitter. In the preferred embodiment, an RFID reader or base station is used. The reader can be configured such that it queries the transmitter at regular intervals. Alternatively, the reader can be manually operated so that readings are made when requested by the equipment operator. In another embodiment, the wireless receiver 60 also includes a storage element. This reduces the complexity required of the device within the housing. In this embodiment, the wireless receiver queries the wireless transmitter/pressure sensor at preferably regular intervals. It receives from the wireless transmitter the current pressure sensor measurement as determined at that time. The wireless receiver 60 then stores this value in its storage element. The capacity of the storage element can vary, and can be determined based on a variety of factors. These include, but are not limited to, the rate at which measurements are received, the rate at which the stored data is processed, and the frequency with which this storage element is in communication with its outside environment.

As an example, consider a filter element having a wireless transmitter 40, such as an RFID tag, coupled with a pressure sensor 30. In this embodiment, the RFID tag is passive, that is, it only sends data upon receipt of a query from the wireless receiver, or base station. Upon receipt of that query, the transmitter transmits the value currently available from the pressure sensor 30. In one scenario, the wireless receiver, which is coupled to a computing device, such as a computer, then stores these values, optionally with an associated timestamp, such as in a log file. In a different scenario, if the wireless receiver is separated from the computer, the receiver will need to store a number of pressure measurements internally, until such time as it is connected to the main computing and/or storage device. In this case, a storage element needs to be integrated with the receiver.

In another embodiment, a wireless transmitter and receiver are not used; rather, the output of the pressure sensor is hard wired to the outside of the housing.

Having defined the physical structure of the present invention, there are a number of applications in which it is beneficial. The following is meant to illustrate some of those applications, however it is not intended as a recitation of all such applications.

In one embodiment, the present invention is used in conjunction with in situ Integrity Testing. This process allows the operator to certify the integrity of the filters within the filter housing at the customer site without additional equipment. Specifically, a gas, typically air, is pressurized to a predetermined pressure upstream of a liquid wetted filter contained within an air tight housing. The pressure within the housing will decay over time as a result of diffusional and potentially convective flow of gas through the filter. The rate of pressure decay is used to establish the integrity of the filter element. In one embodiment, as shown in FIG. 3, a differential pressure sensor is preferably positioned in the nose of the filter. This sensor, preferably in combination with an orifice or venture is able to measure the gas flow through the filter via the venturi effect. As mentioned above, preferably an orifice is positioned in the nose of the filter 10 such that the pressure drop, such as at 10 cc/min, is measurable with a high degree of accuracy. This orifice is preferably removable and only needs to be placed in the flow path during this integrity test. In a second embodiment, as shown in FIG. 4, a gas flow measuring device, such as an anemometer or mass flow device, is employed to measure the gas flow directly.

For multi-round systems, multiple pressure sensors can be introduced, so as to be able to determine the diffusion rate for each individual filtering element. Currently, systems where multiple filters are used in parallel are difficult to test. In this situation, the specifications are multiplied by the number of filters in the housing. Therefore, the ability to detect defects is significantly reduced, because the errors are also multiplied. Additionally, if a defect is found, it is not easily discernible which filter was defective and each would need to be tested individually. The use of pressure or flow sensors in each filter improves the sensitivity of the test and allows each filter to be independently tested. In addition, the preferred bubblepoint integrity test, which measures gas flow over a broad range of increasing pressures, can be measured on each filter individually; a test protocol which is not possible currently.

In one embodiment, a plastic filter housing is utilized, allowing the wireless transmitter to transmit pressure data through the housing at any time.

The present invention also enables the monitoring of transmembrane pressure. This monitoring of transmembrane pressure has several benefits and applications. For example, the preferred start up procedure for microfiltration (MF) filters is to ramp the operating pressure, rather than opening to full operating pressure immediately. This approach avoids air locks within the filter and increases the filter's useful life. Internal pressure sensors can be utilized to monitor the pressure within the housing and thus, affect the proper ramp of operating pressure. In the preferred embodiment, a differential pressure sensor is located in the end cap of each filtering element, thereby allowing both the upstream and downstream pressure to be observed. In one embodiment, the pressure readings are transmitted via an RFID tag through the plastic housing to an external wireless receiver.

Once the assembly has reached its operating pressure, the internal pressure sensors allow continued monitoring of the filters. For example, plugging of the filter will lead to a reduction in flow rate and thus a corresponding reduction in pressure on the downstream side of the filter. Based on the rate at which the transmembrane pressure changes, an estimate of the useful life of the filter can be made. If the pressure is sampled on a continuous basis, any aberrant pressure fluctuations are observable and these can be accounted for in estimating the remaining useful life of the filter.

The above procedure is also applicable to multi-element filter arrangements. In the preferred embodiment, a pressure sensor is used to measure the upstream and downstream pressure of each filtering element by affixing the sensor to the end cap of each filter. The pressure measurements allow the operator to understand better the operation of each filter within the filter housing individually. For example, if a pressure drop were detected between the upstream and downstream sides of a filtering element, it typically would indicate a plugging or fouling of that element. As explained above, the rate at which the transmembrane pressure changes allows an estimation of useful filter life to be made. Similarly, if the pressure across each filter is sampled on a continuous basis, any aberrant pressure fluctuations are observable and these can be accounted for in estimating the remaining useful life of that particular filter.

Figure 5:
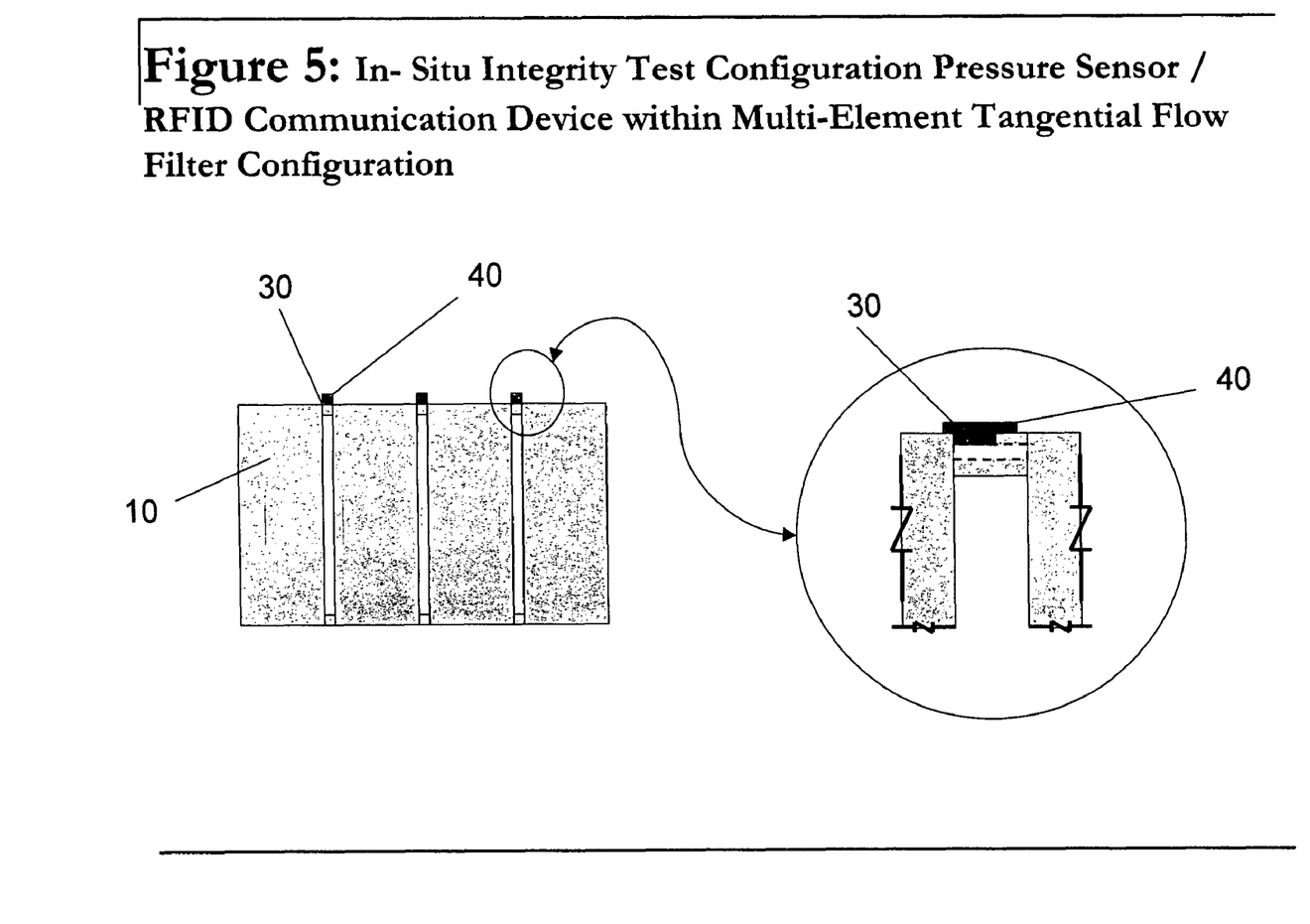
FIG. 5 is a representative embodiment of the present invention as used to perform in situ integrity testing of tangential flow filters.

Additionally, the present invention may be used to monitor specific operating parameters, such as transmembrane pressure, in tangential flow filtration (TFF) devices. These devices are typically used in milti-filter, module, configurations. Traditionally, the pressure drops between modules in TFF devices are not monitored. This monitoring can be performed by introducing pressure sensors between modules, as shown in FIG. 5. By monitoring the pressure drop between modules, the flow rate can be estimated. This flow rate can help determine that all modules are operating as designed, especially during cleaning. The cleaning operation can be verified when the individual membrane flux is recovered in each module individually. Additionally, pressure sensors can be employed within the membrane stacks in a module to monitor the transmembrane pressure or the transchannel pressure to ensure even flow access to each channel and to ensure that the module flux is uniform across the module. Additionally, by monitoring the pressure at various points within the housing, it is possible to determine internal flows. Once this is known, this information can be then used to regulate the flow within the channels so as to ensure that the entire module is used in a uniform manner. Finally, the integrity of a TFF module as measured by a diffusion test, can be determined for each module individually by measuring the gas flow in the outlet port of each module. The pressure measurements recorded by the pressure sensors are transmitted outside the filter housing through the use of the transmitter.

What is claimed:

1. A method of determining the integrity of individual filtering elements within a multi-filter housing, comprising: a. placing a plurality of filtering elements in parallel, each having an input side and an output side, and a corresponding plurality of pressure sensors, inside said multi-filter housing, each of said plurality of sensors being associated with said output side of a respective one of said plurality of filter elements and located in close proximity to said respective one of said plurality of filter elements so as to be able to determine the diffusion rate for said associated individual filtering element; b. introducing a gas at a predetermined pressure into said multi-filter housing at the input side of each filtering element; c. measuring with each said sensor a pressure at the output side of each filtering element with which each respective sensor is associated while each of said filtering elements is within said multi-filter housing; d. determining whether each said measured pressure is within a predetermined range; and e. identifying any individual filter elements with measured pressures outside said predetermined range.

2. The method of claim 1, further comprising positioning a respective pressure sensor on the input side of each of said filtering elements for determining the pressure on said input side.

3. The method of claim 1, further comprising the step of: f. replacing any identified filtering element that has a measured pressure outside said predetermined range.

4. The method of claim 1, further comprising combining each said sensor with an orifice, and wherein said pressure comprises gas pressure.

5. The method of claim 1, further comprising repeating step b. at increasing pressures and repeating steps c. and d. for each increased pressure.

6. The method of claim 1, further comprising providing a wireless transmitter, in communication with each said sensor and a receiver located outside of said housing and transmitting pressure measured by each said sensor via said wireless transmitter to said receiver.

7. The method of claim 1, wherein a flow restriction is placed in the flow path of each filtering element on said output side and said pressure is measured across said restriction.

8. The method of claim 1, further comprising providing a wireless transmitter, in communication with each said sensor and wherein said wireless transmitter comprises an RFID tag.

9. The method of claim 1, further comprising: providing a wireless transmitter, in communication with each said sensor and a receiver located outside of said housing; transmitting the pressure measured by each said sensor via the wireless transmitter to the receiver; and wherein the receiver comprises a wireless receiver, adapted to receive signals transmitted from said wireless transmitter.

10. The method of claim 1, wherein each of said filtering elements has a nose, and wherein each of said sensors is embedded in said nose of each filtering element.

11. The method of claim 1, wherein each of said filtering elements has a nose, and further comprising providing a wireless transmitter, in communication with each said sensor and wherein each said sensor and wireless transmitter is embedded in said nose of each filtering element.

12. The method of claim 1, further comprising the step of wetting each filtering element before step b.

* * * * *